United States Patent [19]

Lingner

[11] Patent Number: 4,952,079
[45] Date of Patent: Aug. 28, 1990

[54] ROLLER BEARING CAGE

[75] Inventor: Horst Lingner, Herzogenaurach, Fed. Rep. of Germany

[73] Assignee: INA Walzlager Schaeffler KG, Fed. Rep. of Germany

[21] Appl. No.: 936,172

[22] Filed: Dec. 1, 1986

[30] Foreign Application Priority Data

Dec. 7, 1985 [DE] Fed. Rep. of Germany ....... 3543364

[51] Int. Cl.$^5$ .............................................. F16C 33/54
[52] U.S. Cl. .................................... 384/575; 384/572; 384/579; 384/580
[58] Field of Search ............... 384/575, 580, 576, 578, 384/572, 579

[56] References Cited

U.S. PATENT DOCUMENTS

| | | | |
|---|---|---|---|
| 2,772,128 | 11/1956 | Schaeffler et al. | 384/580 |
| 3,365,775 | 1/1968 | Cavagnero et al. | 384/575 |
| 3,802,754 | 4/1974 | Pitner | 384/580 |
| 3,992,764 | 11/1976 | Serasio | 384/575 |

Primary Examiner—Lenard A. Footland
Attorney, Agent, or Firm—Bierman and Muserlian

[57] ABSTRACT

A roller bearing cage for cylindrical rollers comprising two parallel end rings (1) connected by a plurality of crossbars (2) distributed over the circumference of the cage to form pockets (3) for accommodating two adjacent rollers (4) in each pocket, the crossbars (2) being provided with holding projections (5) in the area of their inner and outer border edges projecting into the pockets (3), the cage being made of a flat sheet metal strip rolled into a round shape and welded at the abutment point (6) where the ends of the strip meet in the area of a pocket (7) being dimensioned to accommodate a single roller (4).

1 Claim, 1 Drawing Sheet

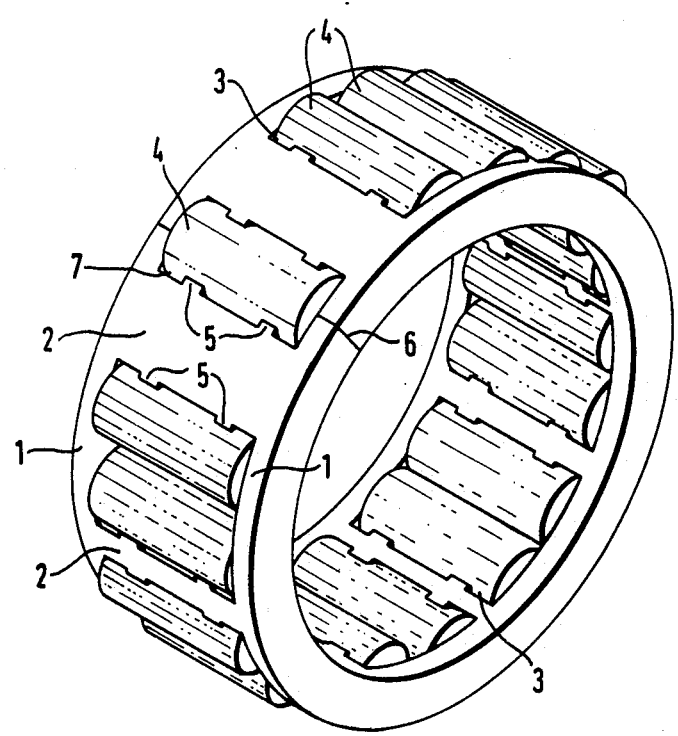
Fig.1
Fig.2
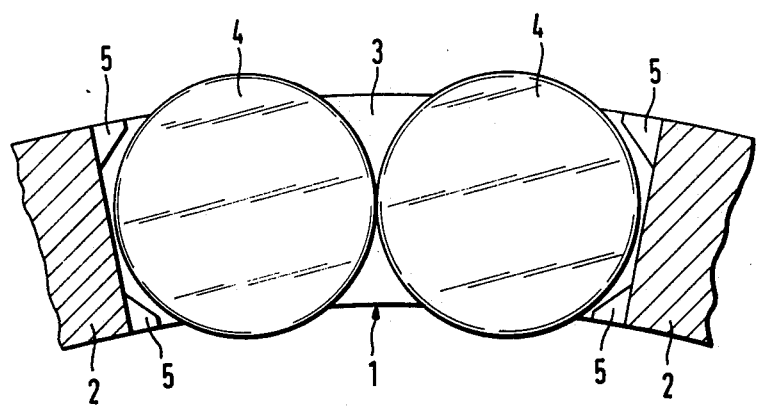

ROLLER BEARING CAGE

STATE OF THE ART

Cages for cylindrical rollers having two rollers accommodated in a single pocket have been known for a long time and if the means for holding the rollers in the pockets of the known cages was effected through projections from the crossbars into the pockets, very narrow tolerances had to be maintained for the width of the pockets. If this was not possible, far more expensive support means had to be used such as axial holding projections emerging from the end rings to overlap the frontal movements of the rollers.

With modern production techniques, it is possible to maintain the necessary tolerances when the roller support means comprises holding projections on the crossbars. However, cages which are formed by rolling a flat metal strip into a round shape and welded at the point of abutment of the ends of the strip in the area of a pocket, width tolerances occur due to the welding whereby a safe support system of the rollers is no longer guaranted.

OBJECTS OF THE INVENTION

It is an object of the invention to provide a simple and economical cage for rollers free of the prior art problems for the roller support means.

This and other objects of the invention will become obvious from the following detailed description.

THE INVENTION

The novel cage of the invention for cylindrical rollers is comprised of two parallel end rings (1) connected by a plurality of crossbars (2) distributed over the circumference of the cage to form pockets (3) for accomodating two adjacent rollers (4) in each pocket, the crossbars (2) being provided with holding projections (5) in the area of their inner and outer border edges projecting into the pockets (3), the cage being made of a flat sheet metal strip rolled into a round shape and welded at the abutment point (6) where the ends of the strip meet in the area of a pocket (7) being dimensioned to accommodate a single roller (4). The provision of a single roller in the pokcet where the soldering occurs provides adequate support even with considerably wide tolerances.

Referring now to the drawings:

FIG. 1 is a perspective view of a cage of the invention.

FIG. 2 is an cross-sectional view of a roller pocket of the cage of FIG. 1 with two rollers therein.

The cage of FIG. 1 is made by rolling a flat strip into a round shape and comprises two end rings (1) connected by a plurality of axial crossbars (2) to form pockets (3) which accommondate two rollers (4) each. FIG. 2 illustrates the arrangement of the rollers (4) in a cross-section of a pocket (3) and shows holding projections (5) provided on the crossbars (2) projecting into pocket (3) thereby preventing the rollers (4) from falling out of the pocket in either radial direction.

The abutment point 6 of FIG. 1 where the ends of the cage meet after being bent into its round shape is welded and at point (6), there is situated a pocket (7) which accommodates only a single roller.

Various modifications of the cage of the invention may be made without departing from the spirit or scope thereof and it is to be understood that the invention is to be limited only as defined in the appended claims.

What I claim is:

1. A roller bearing cage for cylindrical rollers comprising two parallel end rings (1) connected by a plurality of crossbars (2) distributed over the circumference of the cage to form pockets (3) for accommodating two adjacent rollers (4) in each pocket, the crossbars (2) being provided with holding projections (5) in the area of their inner and outer border edges projecting into the pockets (3), the cage being made of a flat sheet metal strip rolled into a round shape and welded at the abutment point (6) where the ends of the strip meet in the area of a pocket (7) being dimensioned to accommodate a single roller (4).

* * * * *